April 7, 1942.    B. Q. JONES    2,278,450
MILITARY VEHICLE BODY
Filed Oct. 8, 1941    4 Sheets-Sheet 1
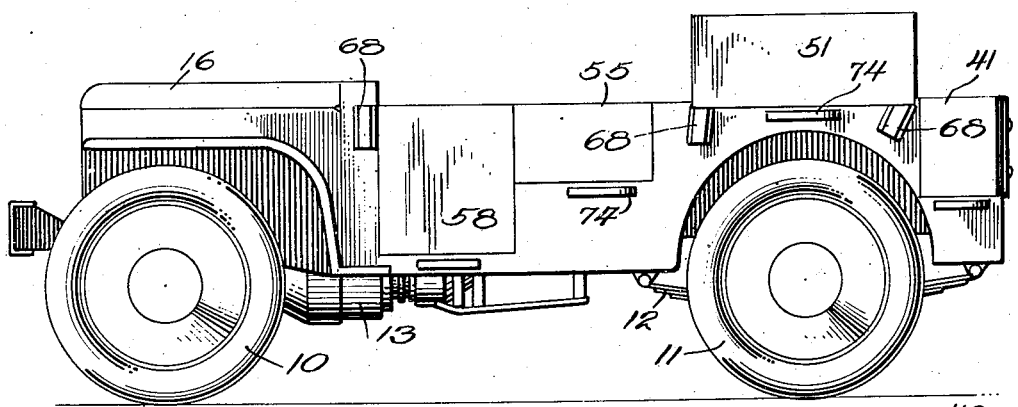
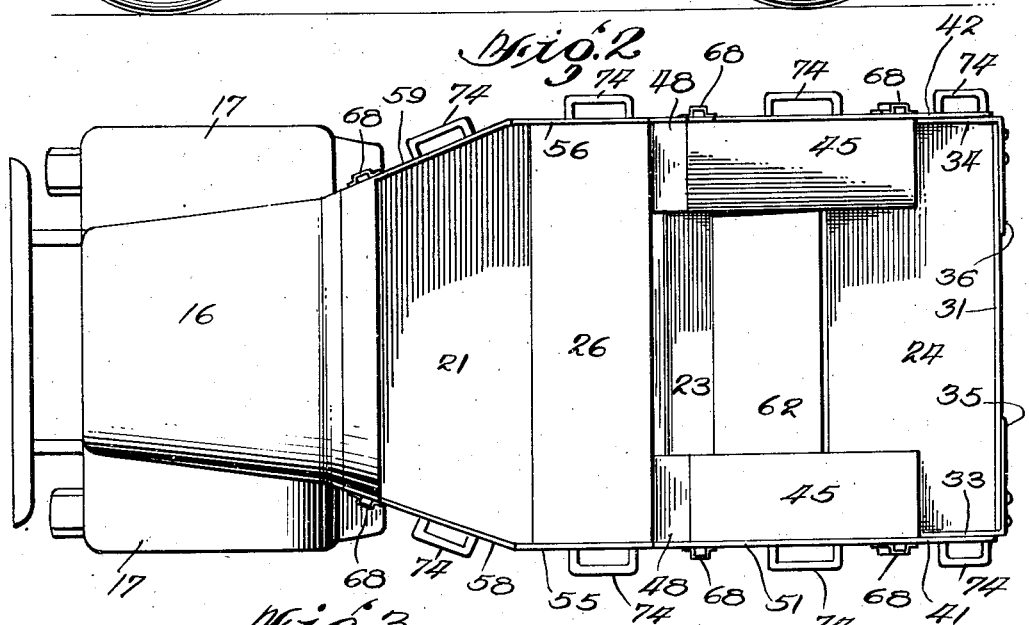
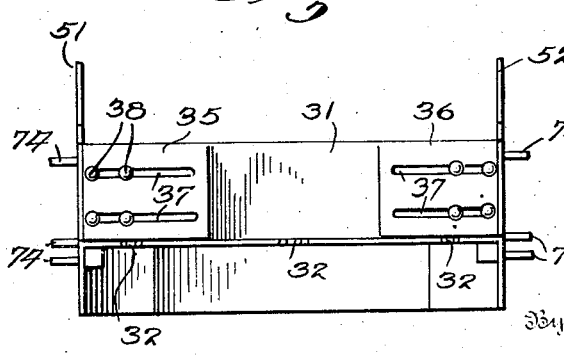
Inventor
Byron Q. Jones
Attorney April 7, 1942.  B. Q. JONES  2,278,450

MILITARY VEHICLE BODY

Filed Oct. 8, 1941  4 Sheets-Sheet 2

Inventor
Byron Q. Jones
By W. F. Doyle
Attorney

April 7, 1942.                B. Q. JONES                    2,278,450
                          MILITARY VEHICLE BODY
                           Filed Oct. 8, 1941            4 Sheets-Sheet 3
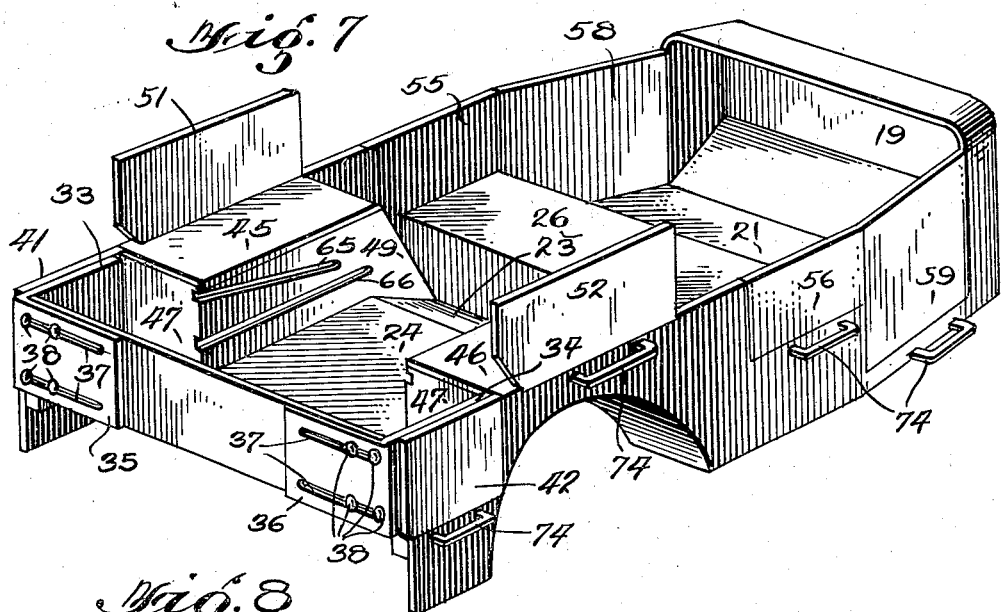
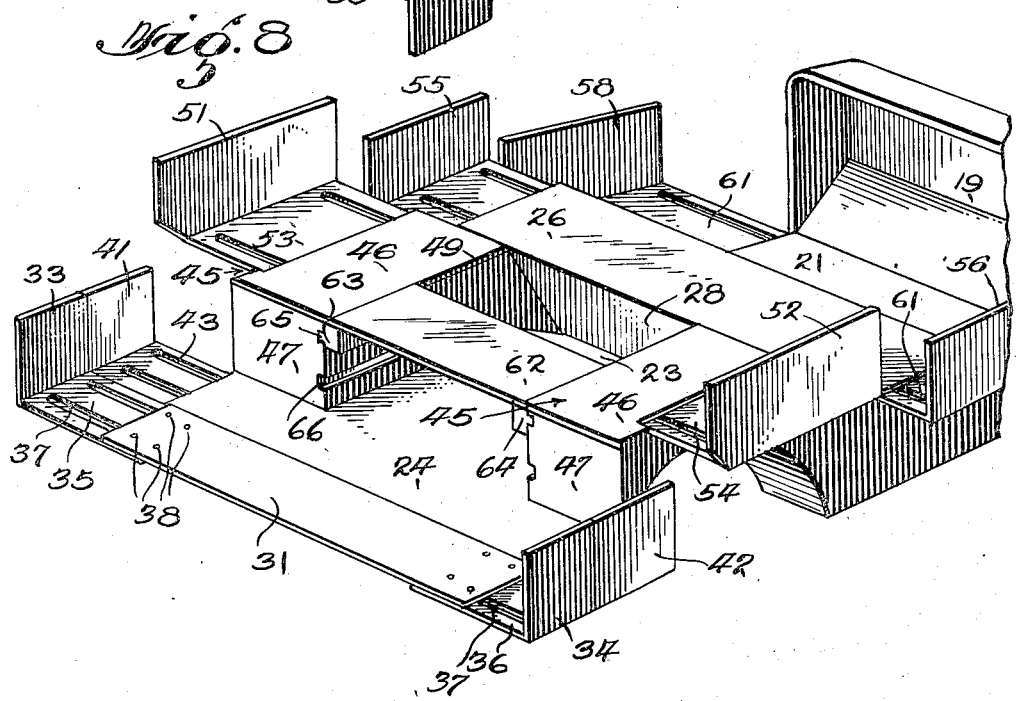
Inventor
Byron Q. Jones
By
Attorney April 7, 1942.    B. Q. JONES    2,278,450
MILITARY VEHICLE BODY
Filed Oct. 8, 1941    4 Sheets-Sheet 4

Inventor
Byron Q. Jones
By H. F. Doyle
Attorney

Patented Apr. 7, 1942

2,278,450

UNITED STATES PATENT OFFICE 2,278,450

MILITARY VEHICLE BODY

Byron Q. Jones, United States Army

Application October 8, 1941, Serial No. 414,123

10 Claims. (Cl. 296—24)

(Granted under the act of March 3, 1883, as amended April 30, 1928; 370 O. G. 757)

The invention described herein, if patented, may be manufactured and used by or for the Government for governmental purposes without the payment of any royalty thereon.

The present invention relates to motor vehicles and more particularly to a small car vehicle body having convertible features whereby it is rendered particularly desirable for military purposes.

One of the principal objects of the invention is to provide a convertible small car body so arranged that a single vehicle may be interchangeably used as a cargo truck, personnel carrier, emergency ambulance, field beds, radio car, trench mortar unit, mobile anti-aircraft machine gun unit, or for other purposes.

A further object of the invention is to provide an all-purpose small car body including shiftable seats, side panels and body panels whereby the various shiftable panels may be arranged to assume different positions in order to make the body particularly adapted to the several different military uses above mentioned.

The above and other objects are accomplished in the present invention by the particular structure and arrangement of parts illustrated in the drawings accompanying and forming a part of this specification, wherein:

Fig. 1 is a side elevation of a midget automobile provided with a convertible, military type body constructed in accordance with the teachings of the following disclosure, the panels being in positions particularly suited to use as a personnel carrier.

Fig. 2 is a plan view of the motor vehicle body illustrated in Fig. 1.

Fig. 3 is a rear elevational view of the vehicle body.

Fig. 7 is a detail perspective view similar to Fig. 6 showing the panels in the positions they assume to provide a cargo body.

Fig. 8 is a perspective view illustrating the shiftable panels of the body in the position preferred when the vehicle is to be used for field beds.

Figure 4:
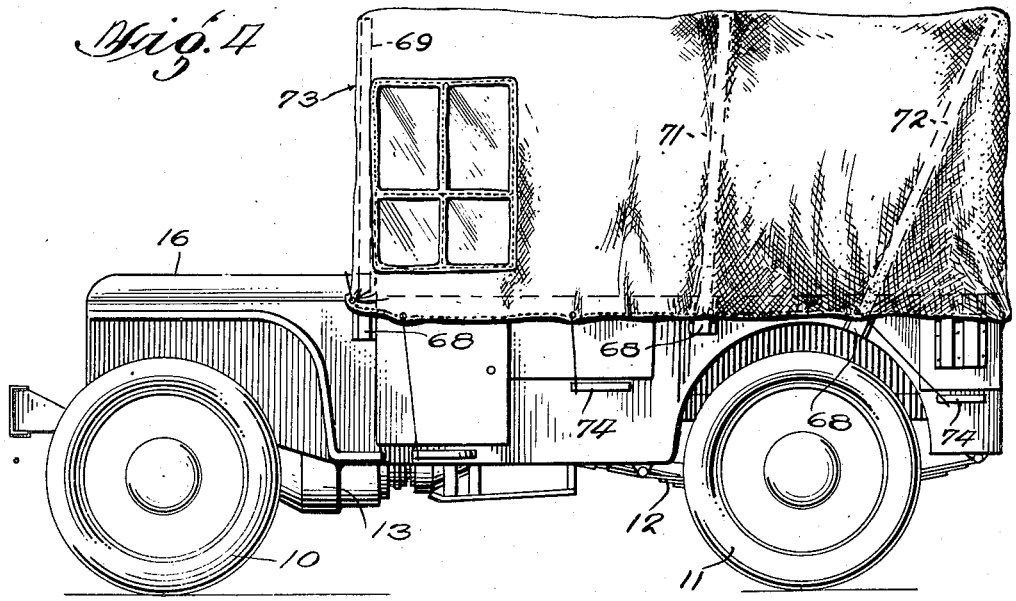
Fig. 4 is a side elevational view of the vehicle equipped with canvas top.

Referring now to the preferred embodiment of the present invention illustrated in Figs. 1 to 8 inclusive, the vehicle body is arranged to be supported on a midget motor vehicle chassis including the wheels 10 and 11, springs 12, motor and transmission mechanism 13, and a frame (not shown). Inasmuch as the mechanical details of the motor vehicle chassis may be conventional and do not form any pertinent part of the present invention they will not be described in further detail in this application.

The particular type of body structure with which this invention is concerned comprises, in general, a hood portion, a driver's compartment, and a cargo body. The hood portion 16 is provided with fenders 17 for the front wheels of the vehicle. The hood is separated from the operator's compartment 18 of the vehicle by a vertical dashboard 19.

The operator's compartment 18 includes a floor panel 21 extending rearwardly from the lower inclined extremity of the dashboard 19 below the gasoline tank 22 and into abutting relationship with an inclined intermediate panel 23 which serves to join the floor panel 21 of the operator's compartment with a floor panel 24 of the cargo body 25. A front seat 26 is provided in the driver's compartment immediately above the gasoline tank and is removably supported by the front and rear supports 27 and 28 respectively. The seat 26 extends the entire width of the operator's compartment.

Figure 5:
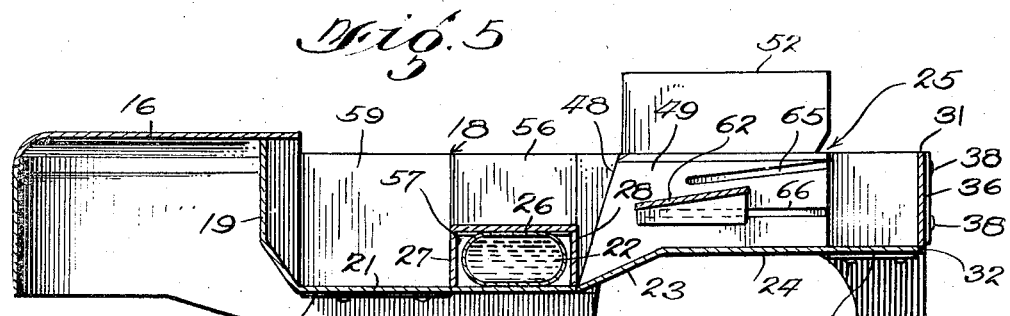
Fig. 5 is a central detail sectional view through the body structure.
Figure 6:
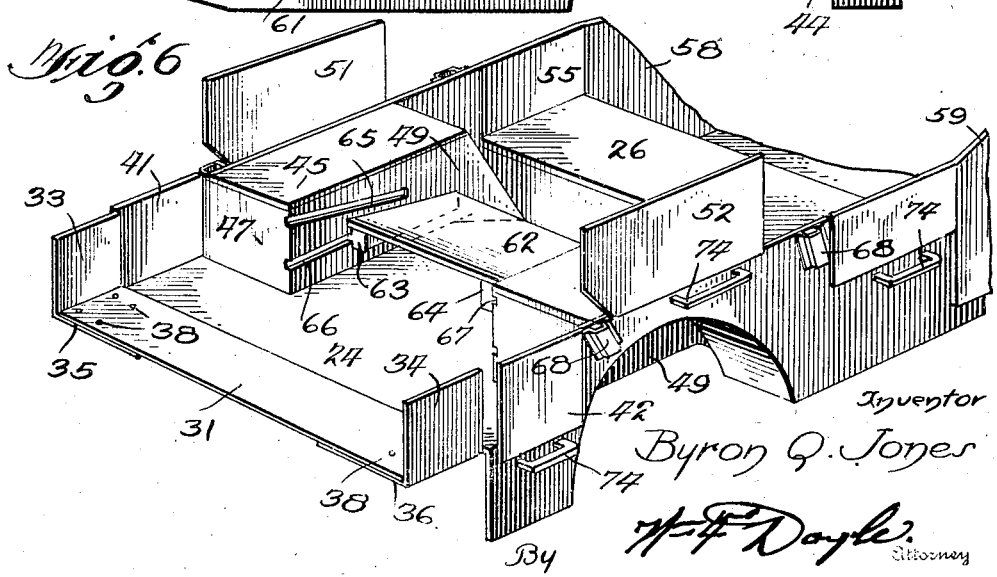
Fig. 6 is a rear perspective view of the vehicle body showing the several shiftable parts of the body in the position they assume when the vehicle is used as a personnel carrier with the tail gate lowered.

The cargo body 25 is provided with a tail gate 31 extending across the complete width of the vehicle and joined to the rear edge of the floor panel 24 by a plurality of hinges 32 so that the tail gate may be swung from a vertical position, such as illustrated in Fig. 5, to a horizontal position as illustrated in Fig. 6, or secured in an angular intermediate position by chains (not shown) in the customary manner known in the art. The tail gate 31 is provided with a pair of side panels 33 and 34, each of which is rigidly mounted at right angles to the extension slides 35 or 36, respectively.

The construction and arrangement of these extension slides 35 and 36 will be readily apparent from an examination of Figs. 3 and 7 of the drawings, where it may be seen that each of the extension slides is provided with a pair of slots 37 mounted in the sliding relationship with headed rivets 38 which are secured in the tail gate 31. The rivets 38 fit loosely in the slots 37 and permit limited sliding movement of the extension slides, but inasmuch as the heads of the rivets 38 are greater in diameter than the width of the slots, the slides are always secured in close face-to-face relationship with the surface of the tail gate. However, since each of the extension slides carries one of the tail gate side panels 33 and 34, which is rigidly mounted on the extension slides at right angles to the plane of the tail gate, the effective width of the tail gate may be increased by extending both of the slides to the position illustrated in Fig. 8. The rear floor portion 24 of the cargo body 25 is also provided with side panels 41 and 42 which are mounted on extension slides 43 and 44, in identically the same manner that the panels 33 and 34 are mounted.

The forward portion of the cargo body 25 includes a pair of wheel wells 45 having top panels 46, a rear panel 47, inclined front panel 48, and interior panel faces 49 which, from an examination of the drawings, will be seen to comprise opposed wheel well wall faces adapted to receive a vehicle seat to be hereinafter described.

The wheel wells 45 are each provided with a pair of side panels 51 and 52 mounted on and at right angles to the extension slides 53 and 54 arranged to extend under the upper panels 46 of the wheel well. The extension slides 53 and 54 are secured by a rivet and slot mounting such as already described in connection with the side panels of the tail gate 31 or by any other suitable sliding means.

A similar pair of side panels 55 and 56 are provided for the front seat 26 and are arranged to be mounted on and slide with the extension slides 57 lying in face-to-face relationship with the lower surface of the front seat 26 at either end of the gasoline tank 22. Similarly, side panels 58 and 59 are provided at the opposite sides of the floor 21 adjacent to the front part of the operator's compartment 18 and these are arranged for similar sliding movement and are mounted on a pair of extension slides 61.

The cargo body 25 is also provided with a removal and adjustable seat portion 62 mounted on a pair of supports 63 and 64, arranged to be secured in tongue and groove relationship with the inner opposed face surfaces 49 of the wheel wells 45. To this end each of the wheel well faces 49 is provided with an upper inclined groove 65 and a lower horizontal groove 66. The tongues 67 of the supports 63 and 64 are arranged at an angle with respect to the plane of the seat 62, the angle being equal to the angle of divergence of the upper groove 65 for reasons that will appear hereinafter.

A number of brackets 68 are provided on the outside walls of the vehicle body in order to support a plurality of bows 69, 71 and 72 over which a canvas top 73 may be arranged (see Fig. 4). The outer surface of the vehicle body is also provided with a number of hand grips 74, for purposes well understood in the art.

Figure 9:
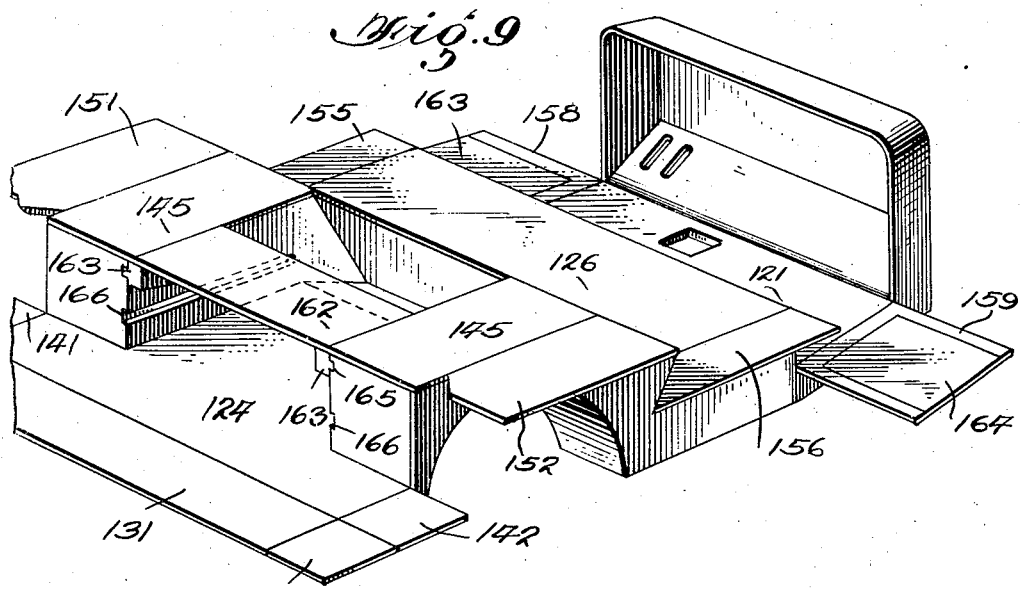
Fig. 9 is a perspective view of a modified form of vehicle body having the shiftable panels arranged to permit the use of the vehicle as a field bed.
Figure 10:
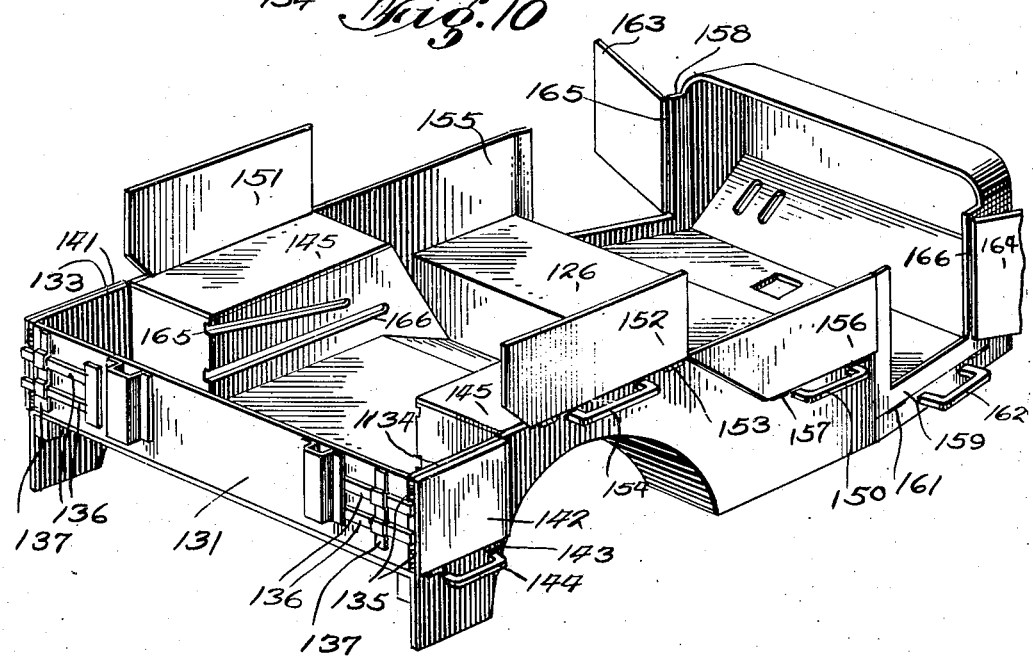
Fig. 10 is a perspective view of the modified vehicle body illustrated in Fig. 9, showing the shiftable panels in the position they assume when the vehicle is used as a cargo truck.

In the modified form of the invention illustrated in Figs. 9 and 10, the various side panels are not provided with extension slides such as heretofore described but are in each instance mounted directly to the adjacent horizontal panel by hinges, so that they may be swung downwardly from a vertical to a horizontal position to increase the area of the vehicle body. In this modification the tail gate side panels 133 and 134 correspond with and serve the same functions as the tail gate panels 33 and 34 hereinbefore described, but instead of being slidingly mounted with respect to the tail gate 131 they are mounted on the hinges 135 so they may be pivoted downwardly from each end of the tail gate 131 to assume the position illustrated in Fig. 9. Additional support for the side panels 134 and 135 is provided by a pair of slide bars 136 secured to the tail gate by a bracket 137 so that they may be extended outwardly beyond the edges of the tail gate to extend across the hinged joint and support the portions 133 and 134.

Side panels 141 and 142 corresponding to the side panels 41 and 42 hereinbefore described are mounted on suitable hinges 143 at each side of the rear floor portion 124 of the truck cargo body and are arranged to hinge downwardly and outwardly to extend the width of the floor of the truck body to the full width of the extended tail gate. The side panels 141 and 142 receive additional support, since the lower surfaces of each of the panels is arranged to rest against the upper surfaces of one of the hand grips 144.

The side panels 151 and 152, corresponding to the side panels 51 and 52, are similarly mounted on hinges 153 and are arranged to receive additional support from the hand grips 154. In the same manner the side panels 155 and 156, corresponding to the panels 55 and 56, are mounted on hinges 157 and receive additional support from the hand grips 150. The forward side panels 158 and 159 at the sides of the forward portion of the driver's compartment are mounted on hinges 161 and supported by the hand grips 162. If desired, each of the panels 158 and 159 may also be provided with a swinging door 163 and 164 secured to the panel by the hinges 165 and 166, respectively.

It has heretofore been stated that one of the principal objects of this invention is the provision of a structure so arranged that certain of the panels of a truck body may be shifted into several different combinations and arrangements so that the vehicle will be particularly suited for any one of several purposes, as, for example, a cargo truck, personnel carrier, emergency ambulance, field beds, radio car, anti-aircraft defense car, trench mortar unit, or canvas-covered truck. These arrangements may be best understood by a separate discussion of each, as follows:

*Personnel carrier*

When intended for use as a personnel carrier for three men or less, the several shiftable panels of the device are moved to the positions illustrated in Figs. 1, 2 and 3. The tail gate 31 is raised so that the end panels 33 and 34 are folded inwardly in face-to-face relationship with the inner surfaces of the side panels 41 and 42, which are also in their retracted position. Similarly, the panels 51 and 52 are moved to a retracted position, as are the side panels 55 and 56 at each end of the front seat 26, so that the entire vehicle is of minimum width. The side panels 58 and 59 are also retracted on opposite sides of the floor 21 of the driver's compartment. With this arrangement, two soldiers may be comfortably seated on the front seat 26 with their feet positioned on the floorboard 21. Another soldier may be seated on the rear seat 62, which is preferably installed in the lower groove 66 by the tongue and groove connection associated with the blocks 63, so that he may use the wheel wells 45 as arm rests and may position his feet on the rear floor surface 24 of the cargo body 25. This is the most compact arrangement of panels in the vehicle body and is used in cases where the vehicle is to be used to transport small numbers of men.

In the modified form illustrated in Figs. 9 and 10, the tail gate 131 is raised so that the end panels 133 and 134 are folded inwardly in face-to-face relationship with the inner surfaces of the side panels 141 and 142, which are also in their vertical position. Similarly, the panels 151 and 152 are raised to a vertical position, as are the side panels 155 and 156 at each end of the front seat 126, so that the entire vehicle is of minimum width. The side panels 158 and 159 are also lifted to a vertical position on opposite sides of the floor 121 of the driver's compartment so that two soldiers may be seated on the seat 126 with their feet positioned on the floor board 131. One more soldier may be seated on the seat 162, which is preferably installed in the lower groove 166 by the tongue and groove connection associated with the blocks 163, so that he may rest his arms on the wheel wells 145 and may position his feet on the rear floor surface 124 of the cargo body.

Nine men personnel carrier

To provide additional seat capacity, the side panels 51 and 52 are slid outwardly on the extension slides 53 and 54 until they assume the position illustrated in Fig. 8. The seat 62 is positioned in the upper grooves 65 of the inner faces 49 of the wheel wells 45 so that the panels 53 and 54, top wheel well panels 46, and seat 62 will all cooperate to form one continuous and substantially smooth seat area. The tail gate 31 is lowered to an angle of about 45 degrees and the panels 33 and 34 extended to provide a full width foot rest. The panels 41 and 42 are also extended to the full length of the tail gate 31 and extension slides 35 and 36, so the floor surface 24 and the extension slides 43 and 44 will cooperate with the tail gate 31 to provide a transverse foot supporting rail.

With the above arrangement, four men may seat themselves on the wide, flat surface, provided by the panels 53 and 54, the top surface 46 of the wheel wells 45, and the rear seat 62. These men may all face rearwardly and position their feet on the floor 24 or tail gate 31. Two more men may also be seated on the forward portions of the wheel well panels 46, it being found comfortable for them to face inwardly and forwardly so that they may rest their backs against the vertical side panels 51 and 52, respectively, and position their feet on the intermediate floor surface 23 behind the front seat 26. Three more men may ride in the front seat 26 and place their feet on the floorboard 21. Thus, by the teachings of this invention, even a small, so-called "midget" vehicle is capable of comfortably transporting as many as nine soldiers.

To provide additional seat capacity in the modified form of body, the side panels 151 and 152 are pivoted outwardly and downwardly on the hinges 153 until they assume the position illustrated in Fig. 9. The seat 162 is positioned in the upper grooves 165 of the inner faces of the wheel wells 145 so that the panels 151 and 152, wheel wells 145, and seat 162, all cooperate to form one continuous and substantially smooth seat area. The tail gate 131 is lowered to a 45 degree angle, and the panels 133 and 134 extended. The panels 141 and 142 are also extended so that the upper surface of the tail gate 131 and extension slides 135 and 136 cooperate with the floor surface 124 and the extension slides 143 and 144 to provide a continuous foot supporting rail. The men may seat themselves in the same manner as described in connection with the description of the preferred embodiment of the device.

Field Beds

The shiftable panels of the vehicle are so arranged that it may be used as a field bed, a feature particularly valuable in operations where no type of shelter is available. Under such circumstances any rain, snow, mud or inclement weather renders a bed directly on the ground undesirable, but the body of the vehicle here disclosed is so arranged that it may be extended to form four separate beds, each extending transversely of the vehicle and each vertically offset from the next adjacent bed. For this purpose, the shiftable panels are all fully extended, as shown in Fig. 8. The forward bed will consist of the floor section 21 and the extension slides 61, terminating in head and foot boards provided by the panels 58 and 59. The second section will consist of the front seat 26 and the extension slides 57, terminating in head and foot boards provided by the panels 55 and 56 at either side of the seat; the third bed will consist of the extension slide 53, the top panel 46 of the wheel wells 45, the seat 62, and the extension slide 54. Here again the vertical side panels 51 and 52 will act as head and foot boards. The rear bed will consist of the floor 24 of the cargo body of the vehicle, the tail gate 31, and the extension panels 35, 36, 43 and 44, which support the end panels 33, 34, 41 and 42, respectively, to provide head and foot boards.

With the above arrangement, it will be apparent that the vehicle will provide reasonably comfortable sleeping accommodations for four officers or men, even under the most adverse circumstances where no shelter is available and the ground is so wet or muddy as to be extremely undesirable for reasons of comfort or health.

In the modified form shown in Figs. 9 and 10, the forward bed will consist of the floor section 121 and the panels 158 and 159; the second section will consist of the seat portion 126 and the extension panels 155 and 156 at either side of the seat; the third bed will consist of the extension panels 151 and 152, the top panels of the wheel wells 145, and the seat 162. The rear bed will consist of the floor 124 of the cargo body of the vehicle, the tail gate 131, and the extension panels 133, 134, 141 and 142.

Emergency ambulance

The vehicle described is also capable of an arrangement whereby it may be used as an emergency ambulance. In this case the forward panels constituting the panels 55 and 56 at each side of the driver's seat 26 and the panels 58 and 59 at each side of the floor 21 of the driver's compartment are retracted and maintained in position illustrated in Figs. 1 to 7, inclusive, so that the operator and one or two passengers may be seated on the seat 26 and may position their feet on the floor 21 of the driver's compartment. The panels adjoining the rear portion of the vehicle are extended, however, as shown in Fig. 8. Thus, the panels 51 and 52 are fully extended on the extension slide members 53 and 54 and the seat 62 is positioned in the upper groove 65 so that the panels 53 and 54 cooperate with the upper surfaces 46 of the wheel wells 45 and of the seat 62 to provide an unobstructed area extending transversely of the vehicle body immediately to the rear of the driver's seat 26 and arranged to receive and support a standard army stretcher. The overall transverse length of the seat or bed portion thus formed is somewhat longer than the dimensions of the standard army stretcher, so that a wounded soldier on a stretcher may be placed directly on the bed thus formed and the vertical side panels 51 and 52 will prevent transverse shifting movement of the stretcher with respect to the vehicle. It will be appreciated, of course, that if desired blankets or other bedding may be applied directly to the panel surfaces, although the use of the stretcher in connection with this arrangement is believed to be more desirable since the entire stretcher may be lifted from the vehicle without unnecessarily disturbing or injuring the patient.

A second area adapted to receive a stretcher is formed by extending the side panels 33 and 34 on the extension slides 35 and 36 and similarly extending the panels 41 and 42 on the extension slides 43 and 44. In this instance, the stretcher area includes the upper surface of the tail gate 31 and the floor portion 24, as well as the combined areas of the extension and panels 35, 36, 43 and 44. The vertical side panels 33, 34, 41 and 42 will act to engage the ends of the stretcher and prevent shifting laterally with respect to the vehicle.

In the modified form of the invention illustrated in Figs. 9 and 10, a similar result is accomplished by lowering the rear panels 131, 133, 134, 141, 142, 151 and 152 to form a rear area equivalent to that composed of the tail gate 31 and panels 35, 36, 43 and 44. Similarly, the panels 151 and 152 are lowered to cooperate with the wheel wells 145 and the seat 162 to provide a forward transverse stretcher area equivalent to that formed of the panels 53 and 54 in connection with the wheel wells 145 and the seat 62, the only difference being that in the device illustrated in Figs. 9 and 10 no vertical end panels are provided to prevent lateral shifting of the stretchers with respect to the stretcher mounting surfaces. It will be understood, of course, that when the vehicle is to be used as an emergency ambulance the forward panels associated with the operator's compartment, namely, the panels 155, 156, 158 and 159 will be in retracted position, as illustrated in Fig. 10.

Canvas-covered truck

The vehicle may also be used as a canvas-covered truck, either as a personnel carrier or as a cargo carrier. In either instance, the tail gate 31 and the side panels 33 and 34 will be folded upwardly, as shown in Fig. 2, and the side panels 41, 42, 51, 52, 55, 56, 58 and 59 will all be moved to retracted position so that the bows 69, 71 and 72 may be inserted in the several brackets 68 on the side walls of the vehicle body, and a canvas cover 73 positioned over the bows and tied to the hand grip 74 by suitable cords.

The interior arrangement of the truck will be identical with the arrangement heretofore described, that is, if the truck is to be used as a cargo truck, the seat 62 will be entirely removed from the wheel wells 45, but if it is contemplated that the vehicle be used as a personnel carrier, the seat 62 will be positioned in one of the grooves 65 or 66, depending on whether one or two soldiers are to ride in the rear seat. In the modified form of the invention the arrangement will be the same.

Other uses

The vehicle, as described, is readily adaptable to other uses as, for example, a radio car, trench mortar carrier, or anti-aircraft defense car. When used for anti-aircraft defense, a machine gun cockpit, not shown, is positioned on the rear floor of the cargo compartment 24. The cockpit is formed of such dimensions that it will closely fit between the two opposed side walls 49 of the wheel wells 45, to prevent shifting of the cockpit with respect to the rest of the vehicle. Similary, when used as a radio car or trench mortar unit the seat 62 is removed and the radio apparatus or trench mortar is positioned in suitable cases, not shown, which fit closely between the wheel wells 45, and are thereby prevented from lateral shifting, while being supported by the floor 24 of the cargo compartment.

From the foregoing disclosure, it will be apparent that by following the teachings of the present invention a military vehicle body may be provided having extremely flexible performance characteristics so that it may be easily arranged to serve any one of a multitude of valuable military purposes. That is, the several shiftable panels are so arranged and correlated that they may be permutably arranged into any one of several different combinations, each having a group of particularly valuable military characteristics, so that a single type of vehicle body may be instantly shifted from an arrangement suitable, for example, as a cargo truck, into a unit of different characteristics suitable as an emergency ambulance or field bed for soldiers.

Having thus described my invention, what is claimed as new and desired to secure by Letters Patent is:

1. In a motor vehicle body, a forward floor portion extending transversely of the vehicle, a pair of shiftable extension panels at each end of said forward transverse floor portion, each of said extension slides being adapted to be extended in a lateral direction from said floor; a transverse seat portion immediately behind the aforementioned floor, said seat portion including a pair of extension panels adapted to be extended longitudinally of said transverse seat; a pair of wheel wells behind the aforementioned seat portion, each of said wheel wells including a top surface, an extension panel associated with each of said wheel wells and adapted to be extended transversely of the vehicle; a rear floor portion, and a pair of extension panels associated with said rear floor portion and arranged to be extended transversely with respect to the vehicle body.

2. In a motor vehicle body, a floor portion, a shiftable extension panel at each side of said floor portion, each of said extension panels being adapted to be extended in a lateral direction from said floor, a seat portion, said seat portion including a pair of extension panels adapted to be extended laterally of the vehicle whereby said seat portion and floor portion may be equally extended on the opposite sides of the vehicle body.

3. In a motor vehicle body, a forward floor portion extending transversely of the vehicle, a pair of longitudinally extending extension slides in face-to-face relationship with the lower surface of each end of said forward transverse floor portion, each of said extension slides being shiftably mounted with respect to the aforementioned floor and adapted to be extended in a lateral direction from either end of said floor, each of said extension slides including a vertical panel at its outer extremity; a transverse seat portion immediately behind the aforementioned floor, said seat portion including a pair of extension slides in face-to-face relationship with the lower surface of each end of said seat, each of said extension slides being adapted to be shifted longitudinally of said transverse seat and each of said slides supporting a vertical panel at its outer extremity; a pair of wheel wells behind the aforementioned seat portion, each of said wheel wells including a flat top surface, an extension slide associated with each of said wheel wells and in face-to-face relationship with the lower surface of said wheel well top member, said extension slides being adapted and arranged to be shifted transversely of the vehicle, and vertical side panels secured to the outer end of said extension slides, a rear floor portion, a pair of extension slides associated with said rear floor portion and slidably mounted in face-to-face relationship with the lower surface of said floor portion, each of said extension slides being arranged for transverse shifting movement with respect to the vehicle body and having a vertical side panel affixed to the outer extremity of said extension slide; a vehicle tail gate pivotally mounted at the rear of said rear floor portion and adapted to assume a horizontal position contiguous with the rear floor portion, a pair of extension slides associated wtih said tail gate in face-to-face relationship with the surface of said tail gate and arranged for limited lateral shifting movement with respect to the vehicle body, and a pair of side panels affixed in right angle relationship with the extension slides and arranged to be shiftable therewith.

4. In a motor vehicle body, a forward floor portion extending transversely of the vehicle, a pair of longitudinally extending extension slides in face-to-face relationship with the lower surface of each end of said forward transverse floor portion, each of said extension slides being shiftably mounted with respect to the aforementioned floor and adapted to be extended in a lateral direction from either end of said floor, each of said extension slides including a vertical panel at its outer extremity; a transverse seat portion immediately behind the aforementioned floor, said seat portion including a pair of extension slides in face-to-face relationship with the lower surface of each end of said seat, each of said extension slides being adapted to be shifted longitudinally of said transverse seat and each of said slides supporting a vertical panel at its outer extremity; a pair of wheel wells behind the aforementioned seat portion, each of said wheel wells including a flat top surface, an extension slide associated with each of said wheel wells and in face-to-face relationship with the lower surface of said wheel well top member, said extension slides being adapted and arranged to be shifted transversely of the vehicle, and vertical side panels secured to the outer end of said extension slides; a rear floor portion, and a pair of extension slides associated with said rear floor portion and slidably mounted in face-to-face relationship with the lower surface of said floor portion, each of said extension slides being arranged for transverse shifting movement with respect to the vehicle body, and having a vertical side panel affixed to the outer extremity of said extension slide.

5. In a vehicle body having floor and seat portions, a plurality of hinged side panels adapted to swing downwardly and outwardly into contiguous horizontal relationship with said floor or seat portions, hinges for said panels, and a plurality of hand-grips positioned immediately below each of said panels and closely adjacent the hinges for said panels, whereby each of said panels engages one of said handles as it reaches a horizontal position so that the panels are each supported by one of the hand grips.

6. In a vehicle body, a front floor portion, a front seat portion, a rear floor portion, a tail gate, and a a pair of wheel wells spaced apart from each other and adapted to partially enclose the wheels of the vehicle, each of said wheel wells including a horizontal top panel, and a plurality of extension panels consisting of hinged side panels at each side of the front floor portion adapted to swing downwardly and outwardly into contiguous horizontal relationship with said floor portion, front seat extension panels pivotally mounted with respect to said front seat and adapted to swing downwardly and outwardly to assume a horizontal position contiguous with said front seat, wheel well extension panels pivotally mounted with respect to said wheel wells and arranged to swing downwardly and outwardly to assume a horizontal position contiguous with the top panels of the wheel wells and rear floor panels pivotally mounted with respect to the floor and arranged to swing downwardly and outwardly to assume a horizontal position contiguous with the rear floor portion.

7. In a vehicle body, a front floor portion, a front seat portion, a rear floor portion, a tail gate, and a pair of wheel wells spaced apart from each other and adapted to partially enclose the wheels of the vehicle, each of said wheel wells including a horizontal top panel, and a plurality of extension panels consisting of hinged side panels at each side of the front floor portion adapted to swing downwardly and outwardly into contiguous horizontal relationship with said floor portion, front seat extension panels pivotally mounted with respect to said front seat and adapted to swing downwardly and outwardly to assume a horizontal position contiguous with said front seat, wheel well extension panels pivotally mounted with respect to said wheel wells and arranged to swing downwardly and outwardly to assume a horizontal position contiguous with the top panels of the wheel wells, rear floor panels pivotally mounted with respect to the floor and arranged to swing downwardly and outwardly to assume a horizontal position contiguous with the rear floor portion, and a plurality of hand-grips positioned immediately below each of said pivotally mounted panels and closely adjacent the pivots for said panels, whereby each of said panels engages one of said handles as it reaches a horizontal position so that the panels are each supported by one of the hand grips.

8. In a motor vehicle body, a transverse seat portion, said seat portion including a pair of extension slides in face-to-face relationship with the lower surface of said seat, each of said extension slides being adapted to be shifted longitudinally of said transverse seat and each of said slides supporting a vertical panel at its outer extremity, said vertical panel being in fixed right-angle relationship wtih the outer extremities of the extension slides and arranged to be shiftable therewith.

9. In a vehicle body, a front floor portion, a front seat portion, a rear floor portion, a pair of wheel wells positioned at opposite sides of said rear floor portion and adapted to partially enclose the wheels of the vehicle, each of said wheel wells including a front panel, a rear panel, a top panel and an inner face panel, the arrangement being such that the inner face panels lie in parallel spaced-apart relationship on opposite sides of the rear vehicle floor, a pair of grooves in each of said face panels, said grooves consisting of an upper inclined groove and a lower horizontal groove in each of said panels, and a rear vehicle seat including a seat portion adapted to extend between said wheel wells, supporting cleats at each end of said seat portion, each of said cleats including a tongue adapted to be received by one of the aforementioned grooves to support the seat, said tongues being inclined with respect to the seat portion so that the cleat tongues may be inserted in the upper grooves to provide a rear seat in contiguous relationship with the top panels of the wheel wells or the tongues may be inserted in the lower grooves to the end that the rear seat will assume a position below the level of the top panels of the wheel wells so that said wheel wells will act as arm rests on either side of the rear seat.

10. In a vehicle body having a floor portion and a seat portion, a pair of wheel wells positioned at opposite sides of the vehicle and adapted to partially enclose the wheels of the vehicle, each of said wheel wells including a top panel and an inner face panel, the arrangement being such that the inner face panels lie in parallel spaced-apart relationship on opposite sides of the vehicle, an inclined groove in each of said panels, and a rear vehicle seat including a seat portion adapted to extend between said wheel wells, supporting cleats at each end of said seat portion, each of said cleats including a tongue adapted to be received by one of the aforementioned grooves to support the seat, said tongue being inclined with respect to the seat portion at an angle equal to the inclination of the grooves in the face panels so that the cleat tongues may be inserted in the upper grooves to provide a rear seat in level contiguous relationship with the top panels of the wheel wells, or the tongues may be reversed so that the rear seat will assume an inclined position.

BYRON Q. JONES.